United States Patent
Caron

(10) Patent No.: US 8,995,944 B2
(45) Date of Patent: Mar. 31, 2015

(54) RADIO FREQUENCY SWITCH FOR SUPPRESSING INTERMODULATION

(75) Inventor: Joshua J. Caron, Madison, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 54 days.

(21) Appl. No.: 13/170,593

(22) Filed: Jun. 28, 2011

(65) Prior Publication Data

US 2012/0146698 A1  Jun. 14, 2012

Related U.S. Application Data

(60) Provisional application No. 61/421,416, filed on Dec. 9, 2010.

(51) Int. Cl.
- *H04B 1/10* (2006.01)
- *H04B 1/48* (2006.01)

(52) U.S. Cl.
CPC . *H04B 1/48* (2013.01); *H04B 1/109* (2013.01)
USPC .......................................... 455/295; 333/103

(58) Field of Classification Search
CPC ........................... H04J 1/12; H03D 2200/0088
USPC ............... 455/78, 83, 114.1–114.2, 295–296, 455/310–311; 333/103
See application file for complete search history.

(56) References Cited

U.S. PATENT DOCUMENTS

| | | | |
|---|---|---|---|
| 4,032,858 A | 6/1977 | Hargis | |
| 4,408,205 A | 10/1983 | Hockham | |
| 5,148,130 A | 9/1992 | Dietrich | |
| 6,392,779 B1 | 5/2002 | Iannelli et al. | |
| 6,496,064 B2 | 12/2002 | Rzyski | |
| 6,757,338 B1 | 6/2004 | Kim et al. | |
| 7,693,674 B2 | 4/2010 | Rzyski et al. | |
| 2002/0070803 A1 | 6/2002 | Rzyski | |
| 2007/0032976 A1 | 2/2007 | Rzyski et al. | |
| 2008/0037590 A1 | 2/2008 | Aiga et al. | |
| 2008/0197936 A1* | 8/2008 | Berg | 333/103 |
| 2009/0015508 A1* | 1/2009 | Prikhodko et al. | 343/876 |
| 2010/0049463 A1 | 2/2010 | Rzyski et al. | |
| 2012/0146742 A1 | 6/2012 | Caron et al. | |
| 2013/0169378 A1 | 7/2013 | Kim et al. | |

OTHER PUBLICATIONS

Non-Final Office Action for U.S. Appl. No. 13/197,216, mailed Sep. 4, 2013, 6 pages.
Non-Final Office Action for U.S. Appl. No. 13/272,537, mailed Sep. 6, 2013, 6 pages.
Notice of Allowance for U.S. Appl. No. 13/272,537, mailed Dec. 4, 2013, 7 pages.
Notice of Allowance for U.S. Appl. No. 13/197,216, mailed Dec. 11, 2013, 9 pages.
Notice of Allowance for U.S. Appl. No. 13/197,255, mailed Jun. 19, 2014, 7 pages.

* cited by examiner

*Primary Examiner* — Christian Hannon
(74) *Attorney, Agent, or Firm* — Withrow & Terranova, P.L.L.C.

(57) ABSTRACT

A radio frequency (RF) switch adapted to reduce third order intermodulation (IM3) products generated as RF signals propagate through the RF switch is disclosed. The RF switch includes N semiconductor switch segments, and N−1 phase shift networks, individual ones of the N−1 phase shift networks being coupled between adjacent ones of the N semiconductor switch segments where N is a natural number greater than 1. In operation, when the RF switch is on, IM3 products generated by the RF switch propagating through the N−1 phase shift networks are phase shifted such that the IM3 products are at least partially canceled.

20 Claims, 16 Drawing Sheets

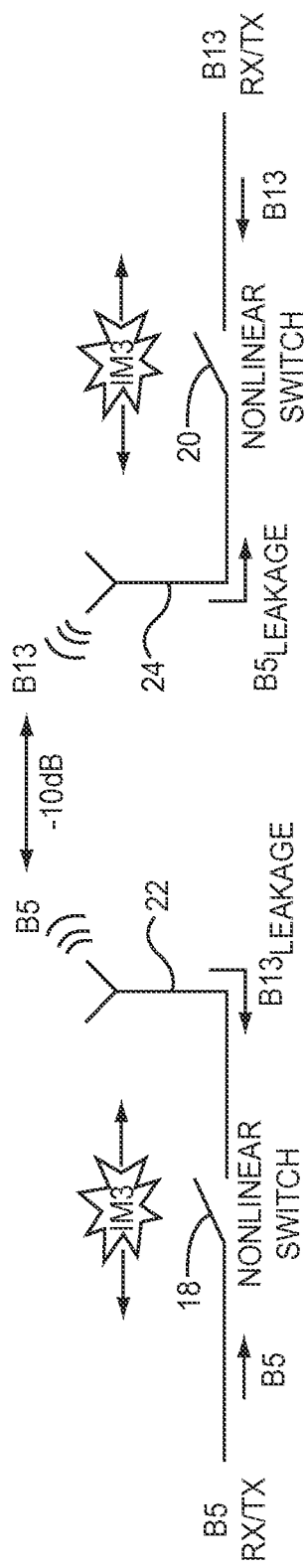
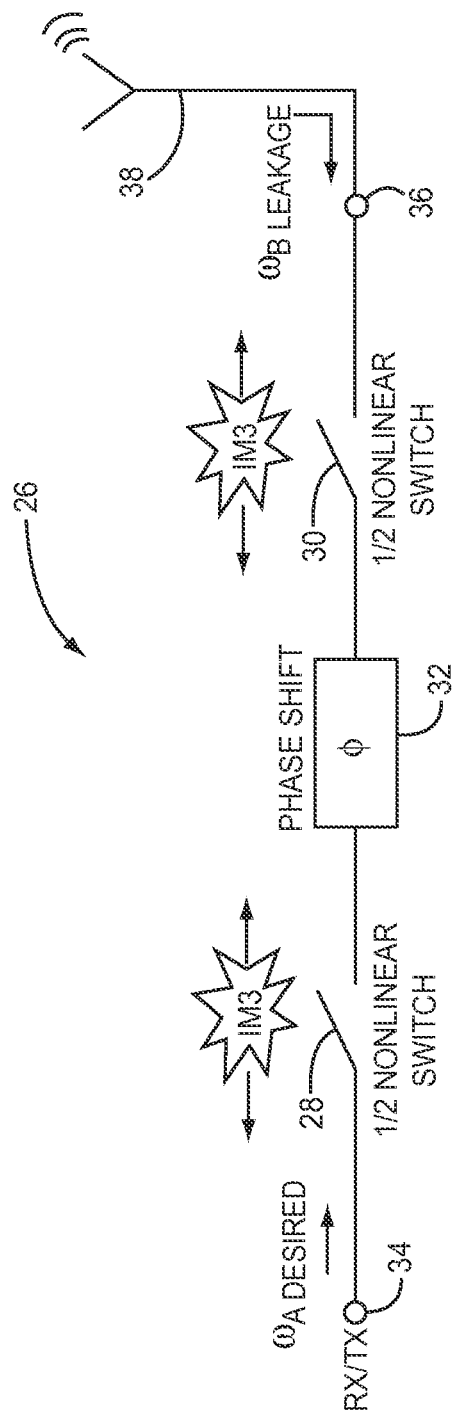
FIG. 3 (RELATED ART)
FIG. 4

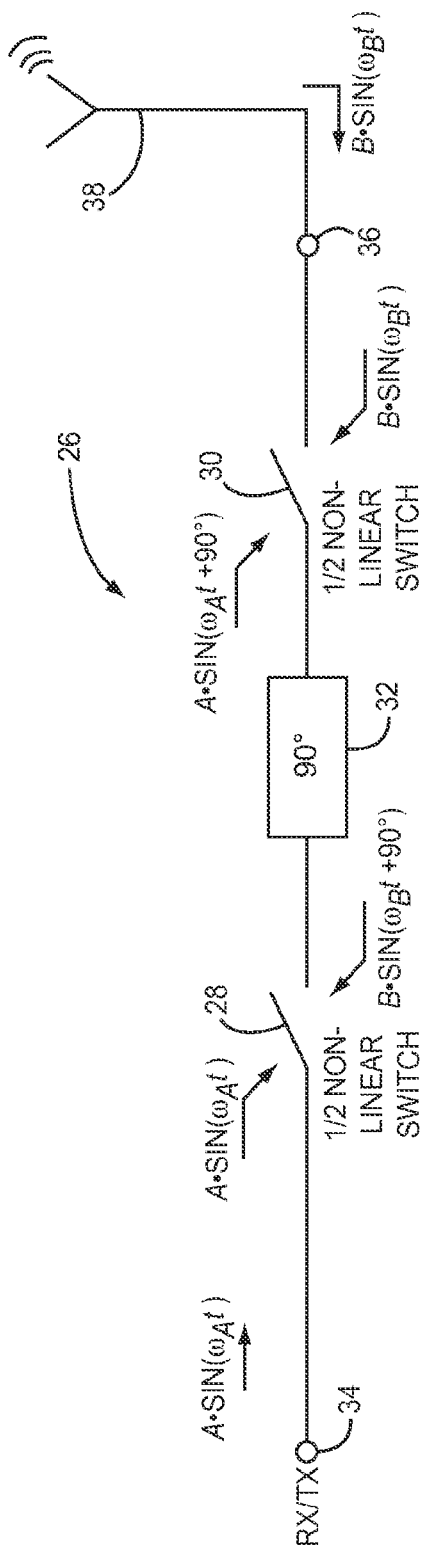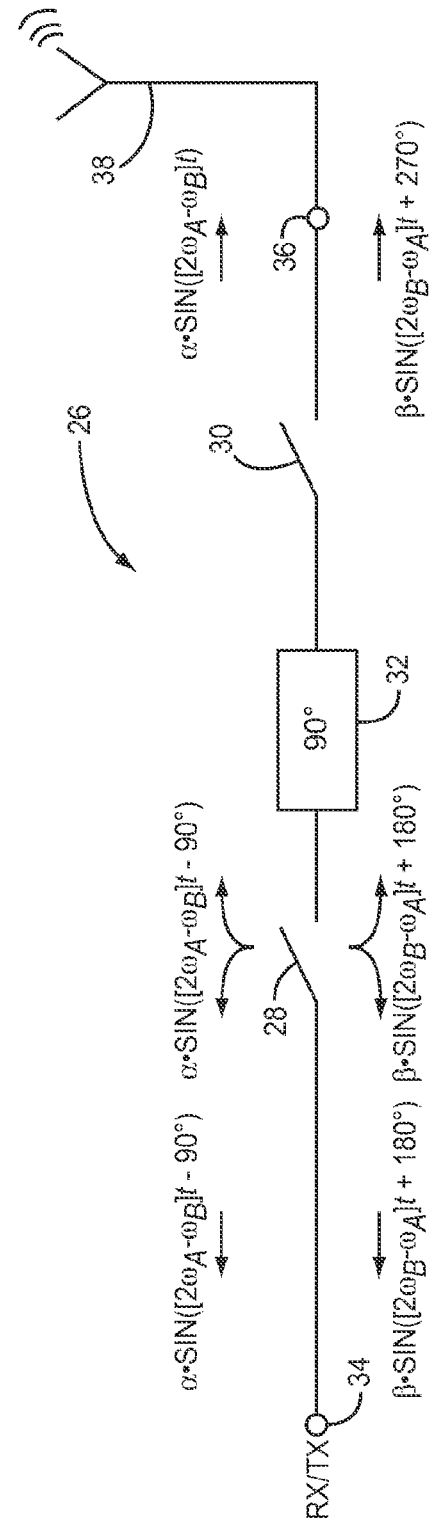

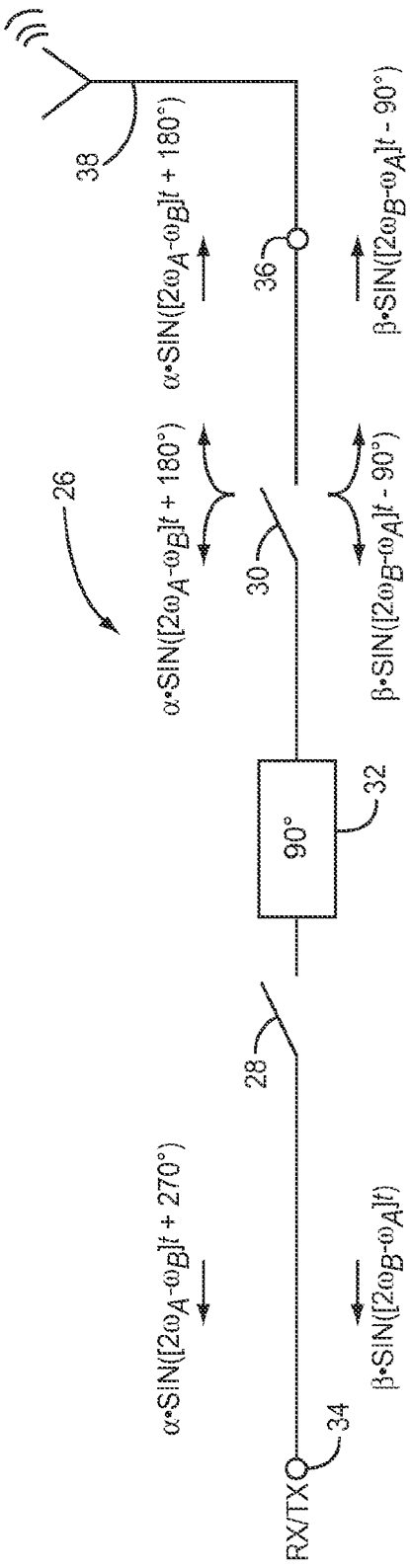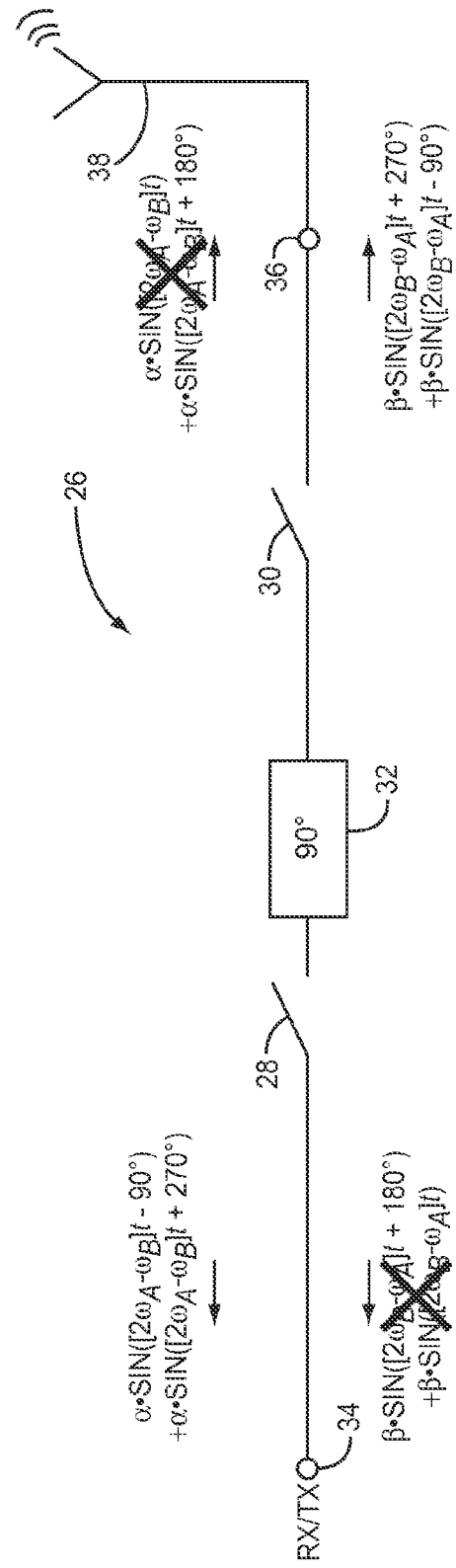

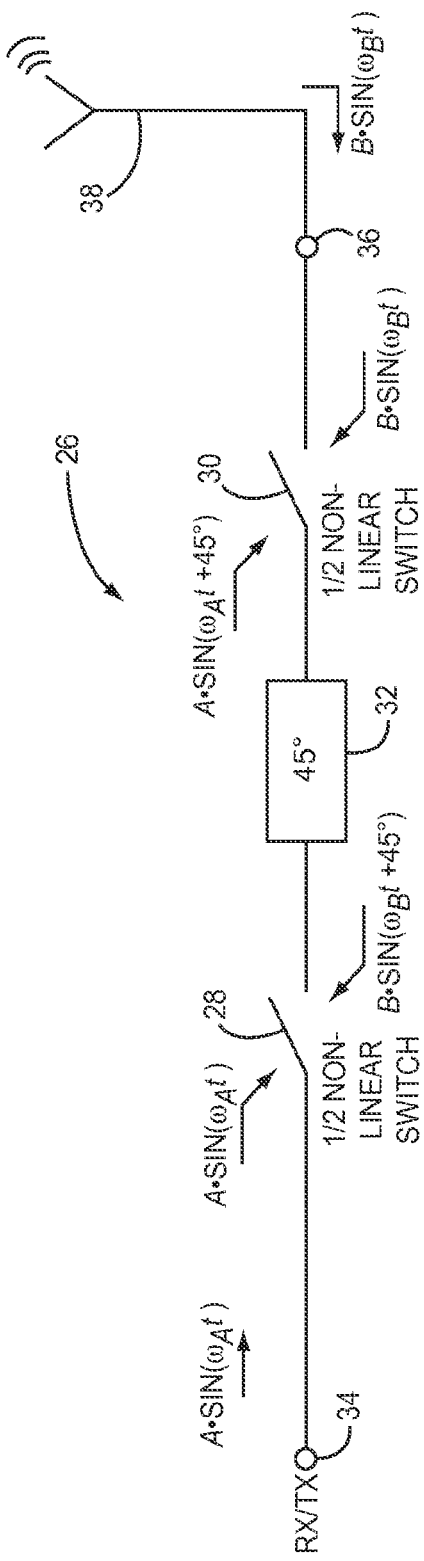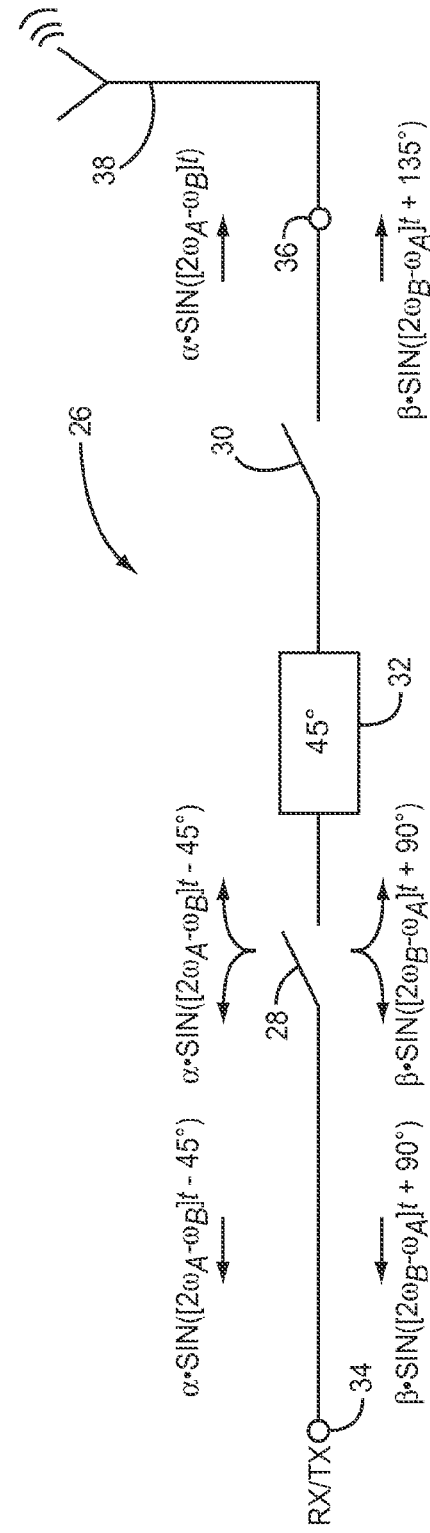
FIG. 7A
FIG. 7B

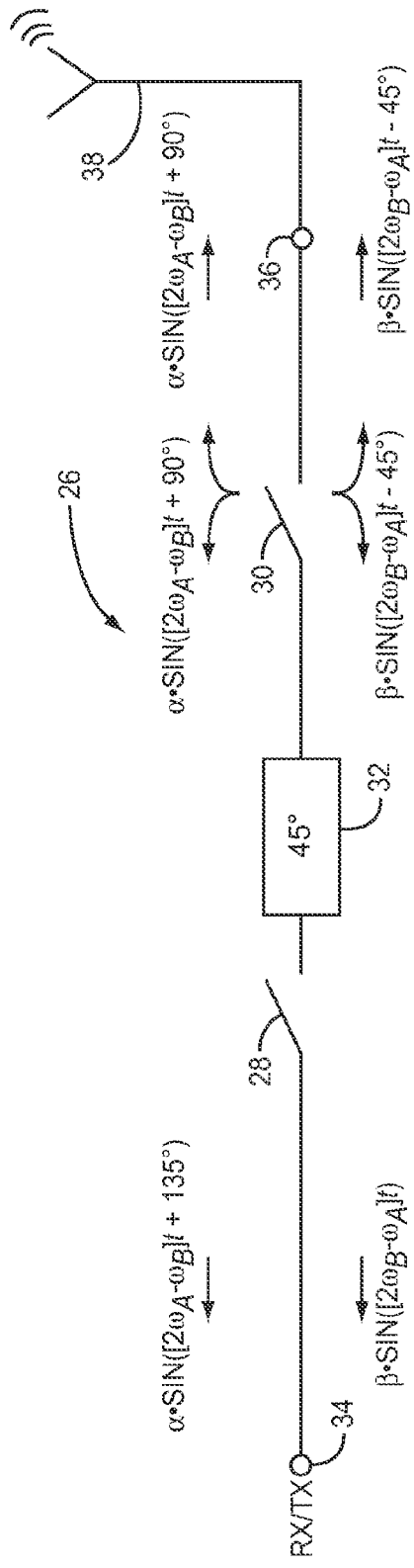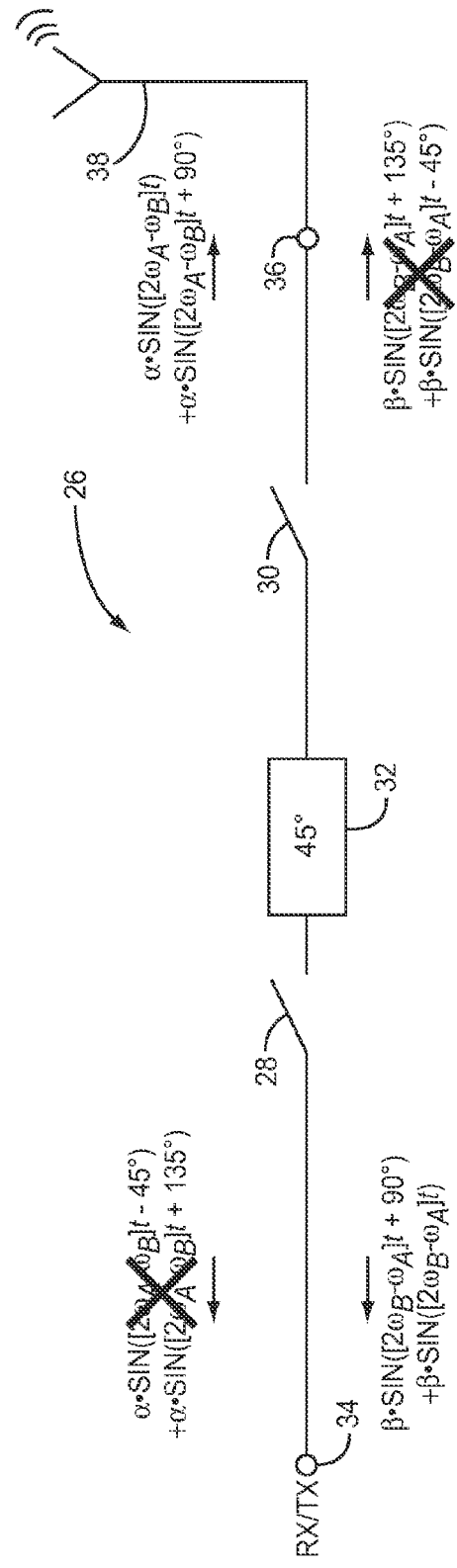
FIG. 7C
FIG. 7D

RADIO FREQUENCY SWITCH FOR SUPPRESSING INTERMODULATION

RELATED APPLICATIONS

This application claims the benefit of provisional patent application Ser. No. 61/421,416, filed Dec. 9, 2010, the disclosure of which is hereby incorporated herein by reference in its entirety.

FIELD OF THE DISCLOSURE

The present disclosure relates to suppressing intermodulation (IM) products generated by electronic devices used in wireless communication products such as mobile terminals.

BACKGROUND

It is well known that mobile terminal operation can be degraded by the presence of a strong interfering signal. For example, a nearby mobile terminal or base station operating at a different frequency can produce strong interfering signals. Furthermore, communications industries, and in particular, the cellular communication industry desires an ability to transmit and receive signals in two separate bands at the same time within a single mobile terminal. However, implementing such a request practically guarantees strong signal interference within the single mobile terminal.

In the short term, a desire to talk and surf the web simultaneously on a single band is not possible due to shortcomings in the Evolution-Data Optimized (EVDO) standard. As a result of these shortcomings, a requirement has emerged for mobile terminals that can operate simultaneously on code division multiple access (CDMA) Band 5 for voice and long term evolution (LTE) Band 13 for data. This requirement is known as simultaneous voice/LTE (SV-LTE).

Unfortunately, due to the aforementioned interference problems, SV-LTE cannot be facilitated by simply operating two cellular front ends at the same time. The major reason that a strong interferer signal degrades mobile terminal operation is a generation of third-order intermodulation (IM3) products in nonlinear electronic components such as RF switches that the signals encounter. This nonlinear phenomenon is a result of compression and/or clipping of the high-power signals as their levels exceed the linear dynamic range of the electronic components. If a signal A is incident upon an electronic component that compresses the signal A, a resulting signal $A_{compressed}$ can be modeled with an odd-order power series as follows in expression (1):

$$A \rightarrow A_{compressed} = \alpha_0 A - \alpha_1 A^3 + \alpha_2 A^5 - \alpha_3 A^7 + \ldots \quad (1)$$

If the compression is relatively light, the coefficients $\alpha_2$, $\alpha_3$, and higher are negligibly small, and the power series can be truncated after the cubic term $\alpha_1 A^3$. Therefore, the signal $A_{compressed}$ is approximated by expression (2).

$$A_{compressed} = \alpha_0 A - \alpha_1 A^3. \quad (2)$$

Now consider the signal A and another signal B that simultaneously engage an electronic component. If the electronic component is perfectly linear, a resultant signal is a superposition of the signal A and the signal B (i.e., A+B). However, practical electronic components suffer from various degrees of nonlinearity. Therefore, a cubic third-order term $\alpha_1(A+B)^3$ is included in expression (3) to more accurately model the resultant signal $(A+B)_{compressed}$.

$$(A+B) \rightarrow (A+B)_{compressed} = \alpha_0(A+B) - \alpha_1(A+B)^3. \quad (3)$$

Expanding the (A+B) of the cubic third order term $\alpha_1(A+B)^3$ into a full polynomial yields the expression (4).

$$(A+B)^3 = A^3 + 3A^2B + 3AB^2 + B^3 \quad (4)$$

If the signal A and the signal B are both sinusoidal the following expressions (5) and (6) are given.

$$A = a \cdot \sin(\omega_1 t + \phi_1) \quad (5)$$

$$B = b \cdot \sin(\omega_2 t + \phi_2), \quad (6)$$

The following trigonometric identities represented by expressions (7), (8), and (9) can be applied to expression (4).

$$\sin^3 x = \tfrac{1}{4}(3\sin x + \sin 3x) \quad (7)$$

$$\sin^2 x = \tfrac{1}{2}(1 - \cos 2x) \quad (8)$$

$$\sin x \cos y = \tfrac{1}{2}[\sin(x+y) + \sin(x-y)]. \quad (9)$$

Expanding out the third-order polynomial from expression (4) using the sinusoidal signals of expressions (5) and (6), it can be seen that the cubic third order term $\alpha_1(A+B)^3$ results in additional frequency content as shown below in expression (10).

$$\begin{aligned}
[a \cdot \sin(\omega_1 + \phi_1) + b \cdot \sin(\omega_2 + \phi_2)]^3 = \quad & (10) \\
(3/4 a^3 + 3/2 ab^2) \cdot \sin(\omega_1 t + \phi_1) + \\
(3/4 b^3 + 3/2 a^2 b) \cdot \sin(\omega_2 t + \phi_2) - 1/4 a^3 \sin(3\omega_1 t + 3\phi_1) - \\
1/4 b^3 \sin(3\omega_2 t + 3\phi_2) - 3/2 a^2 b \sin([2\omega_1 + \omega_2]t + 2\phi_1 + \phi_2) - \\
3/2 ab^2 \sin([\omega_1 + 2\omega_2]t + \phi_1 + 2\phi_2) + \\
3/2 a^2 b \sin([2\omega_1 - \omega_2]t + 2\phi_1 - \phi_2) + \\
3/2 ab^2 \sin([-\omega_1 + 2\omega_2]t - \phi_1 + 2\phi_2).
\end{aligned}$$

In addition to the original frequencies, $\omega_1$ and $\omega_2$, the expression (10) demonstrates that compression results in new products at the third harmonic frequencies, $3\omega_1$ and $3\omega_2$, as well as four additional intermodulation frequencies, $2\omega_1 \pm \omega_2$ and $2\omega_2 \pm \omega_1$. These last four are third order intermodulation (IM3) products, and two in particular, $2\omega_1 - \omega_2$ and $2\omega_2 - \omega_1$, tend to be problematic because they are relatively close in frequency to the original signals. As a result, the $2\omega_1 - \omega_2$ and $2\omega_2 - \omega_1$ IM3 products cannot be easily attenuated with a simple low-pass filter. Hereinafter, the IM3 product $2\omega_1 - \omega_2$ is designated as $IM3_{up}$ and the IM3 product $2\omega_2 - \omega_1$ $IM3_{down}$ represent the IM3 products just above and just below the transmit frequencies, respectively. Furthermore, subsequent references herein to "IM3 products" will refer only to $IM3_{up}$ and $IM3_{down}$, as the two additional IM3 products at $2\omega_1 + \omega_2$ and $2\omega_2 + \omega_1$ are not a particular concern of this disclosure.

FIG. 1 is a frequency spectrum for universal mobile telecommunications system (UMTS) band 5 and evolved UMTS terrestrial radio access (E-UTRA). The frequency spectrum of FIG. 1 illustrates the impact of the $IM3_{up}$ and $IM3_{down}$ products generated by the simultaneous transmission of the signals A and B. Nonlinearity of electronic components is especially problematic in the case of SV-LTE because certain transmit channel combinations result in IM3 products that fall directly within the pass bands of the receivers. Therefore, unless such IM3 products can be dramatically reduced, receivers impacted by the IM3 products can be severely desensed, and a mobile terminal that incorporates the impacted receivers will become essentially useless as long as the IM3 products are present.

FIG. 2 is a circuit diagram of a structure for a related art RF switch 10 that comprises nonlinear components in the form of field effect transistors (FETs) 12 that are stacked for enhanced voltage handling capabilities. The RF switch 10 has a receive/transmit (RX/TX) terminal 14 and an antenna terminal 16. A transceiver (not shown) is typically coupled to the RX/TX terminal 14 and an antenna (not shown) is coupled to the antenna terminal 16. The FETs 12 are practically identical with the exception of parasitic compensation (not shown) to maintain an equal voltage drop across each of the FETs 12. To date, the wireless industry has struggled for a solution to the problem of receiver de-sense due to IM3 products generated by nonlinear components such as the FETS 12.

FIG. 3 is a diagram illustrating a related art approach for reducing power in the IM3 products generated by a first nonlinear switch 18 and a second nonlinear switch 20. The first nonlinear switch 18 and the second nonlinear switch 20 each typically have the structure of the related art RF switch 10 (FIG. 2). A first antenna 22 is used for transmission and reception of signals in a first band (B5) and a second antenna 24 is used for transmission and reception of a second band (B13). Since the first antenna 22 and the second antenna 24 can be designed to provide ~10 dB of isolation, the resulting IM3 products can be reduced proportionally. However, even a 10 dB reduction in IM3 products requires a linearity that is on the order of 10-20 dB higher than current state-of-the-art electronic components such as the first nonlinear switch 18 and the second nonlinear switch 20. As such, there remains a need for additional intermodulation suppression to further reduce IM3 products generated by nonlinear electronic components.

SUMMARY

The present disclosure provides a radio frequency (RF) switch adapted to reduce third order intermodulation (IM3) products that are generated as RF signals propagate through the RF switch. The RF switch includes N semiconductor switch segments, and N−1 phase shift networks. Individual ones of the N−1 phase shift networks are coupled between adjacent ones of the N semiconductor switch segments where N is a natural number greater than 1. In operation, when the RF switch is on, IM3 products generated by the RF switch propagating through the N−1 phase shift networks are phase shifted such that the IM3 products are at least partially canceled.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 3 is a diagram illustrating a related art attempt at relaxing RF switch linearity requirements by utilizing separate antennas transmit and receive paths for the Band 5 (B5) and Band 13 (B13).

FIG. 4 is a diagram illustrating an embodiment of an RF switch that in accordance with the present disclosure provides IM3 suppression generated by signals propagating through the RF switch.

FIGS. 6A-D are switch diagrams that illustrate the generation, flow, and cancellation of IM3 products via an RF switch embodiment of the present disclosure that comprises a 90° phase shift network.

FIGS. 7A-D are switch diagrams that illustrate the generation, flow, and cancellation of IM3 products via an RF switch embodiment of the present disclosure that comprises a 45° phase shift network.

FIGS. 8A-E are switch diagrams that illustrate the generation, flow, and cancellation of IM3 products via an RF switch embodiment of the present disclosure that comprises a pair of 60° phase shift networks.

Figure 9A:
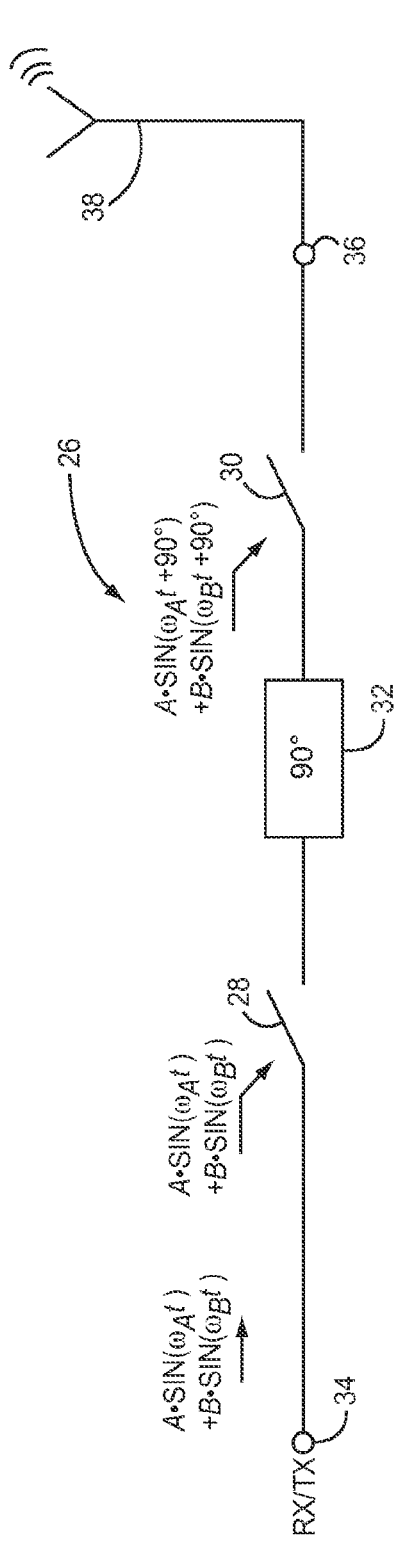
Figure 9B:
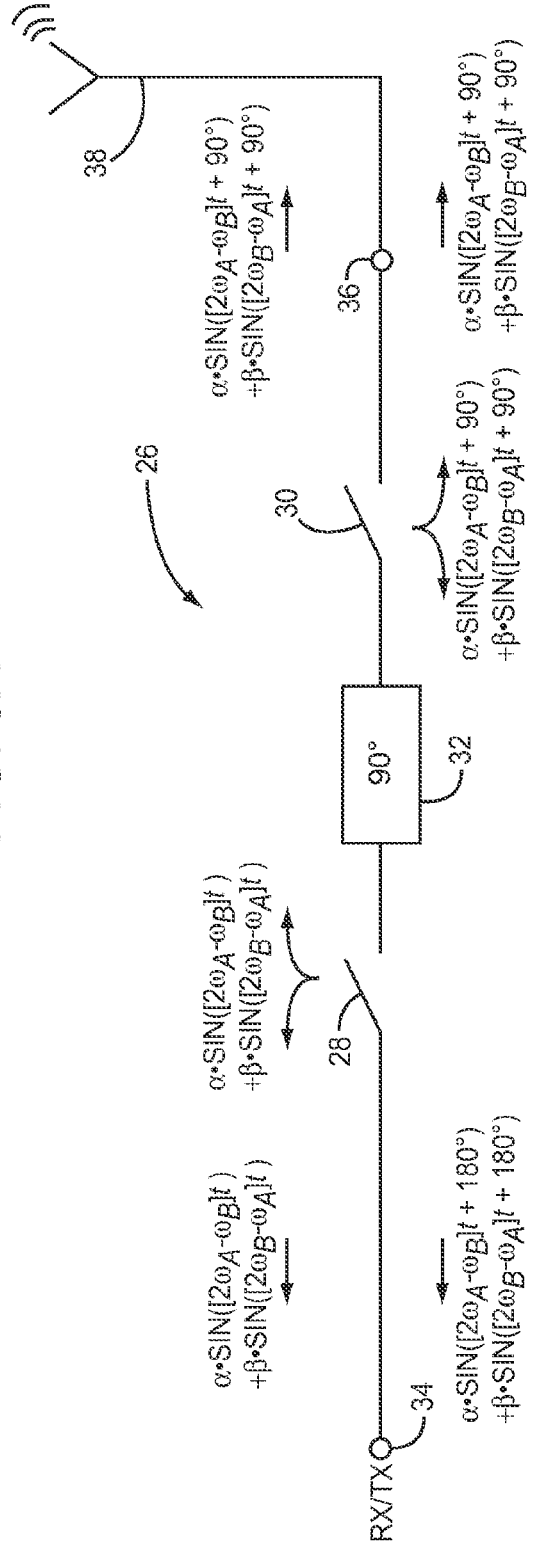
Figure 9C:
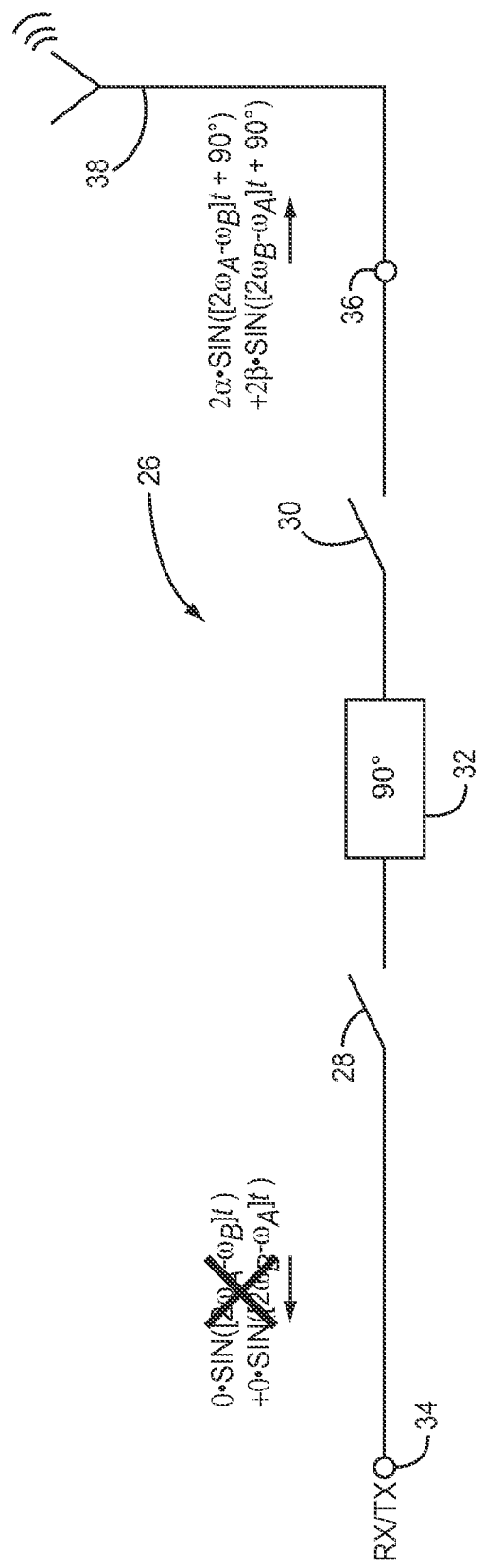

FIGS. 9A-C are switch diagrams that illustrate the generation, flow, and cancellation of IM3 products from two source signals that originate from a single transmitter via an RF switch embodiment of the present disclosure that comprises a 90° phase shift network.

Figure 10:
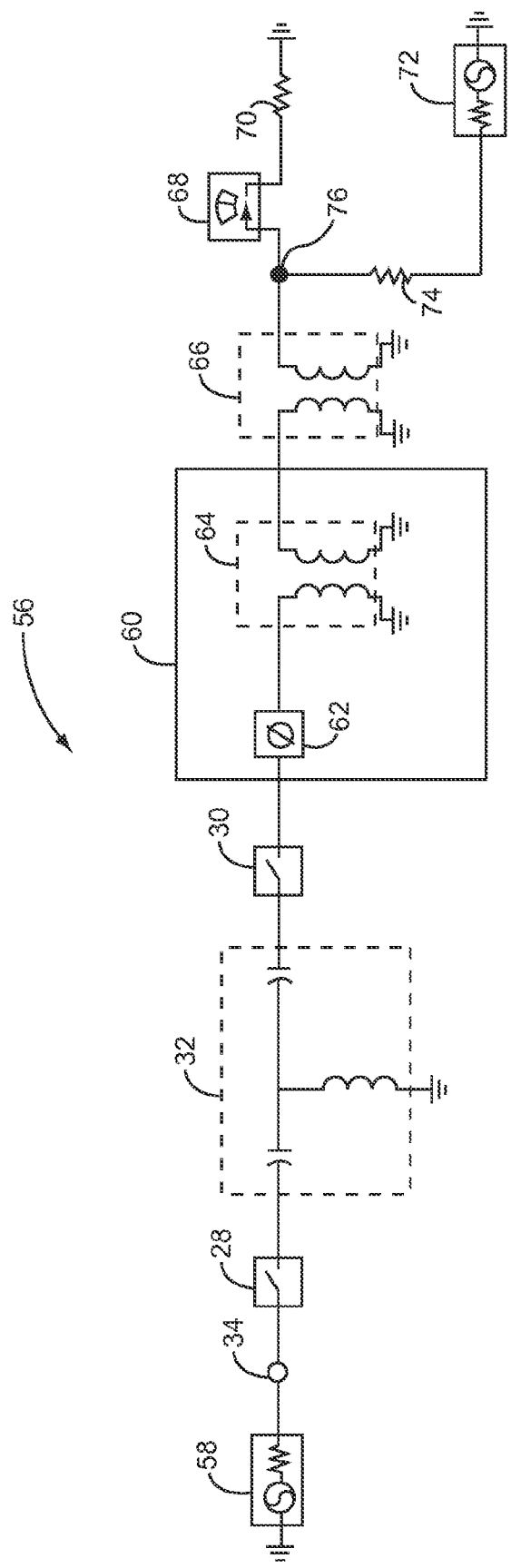

FIG. 10 is a schematic diagram for a simulator configuration that is usable to simulate an embodiment of an RF switch according to the present disclosure.

Figure 11A:
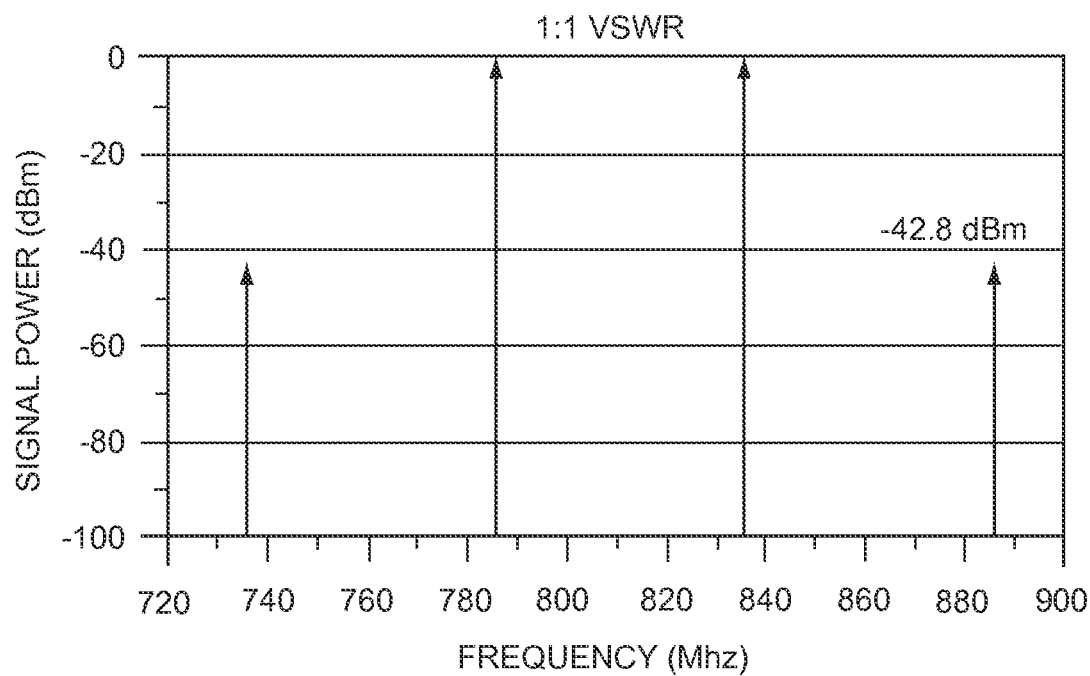

FIG. 11A is a spectral plot of IM3 products generated by a related art RF switch coupled to an antenna having an ideal 1:1 voltage standing wave ratio (VSWR).

Figure 11B:
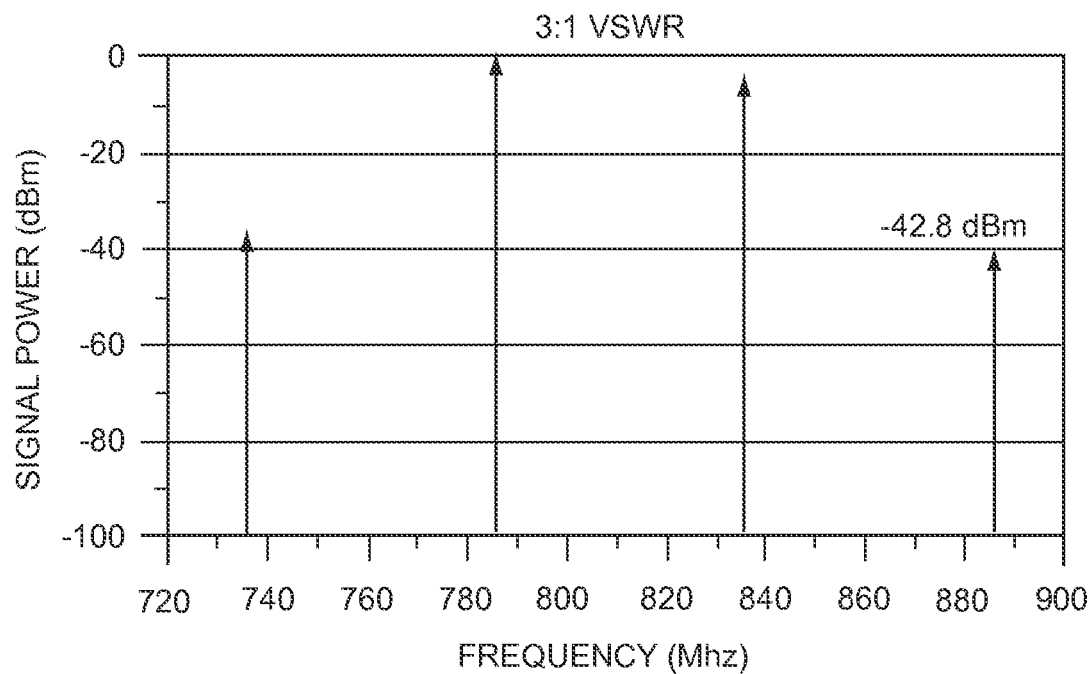

FIG. 11B is a spectral plot of IM3 products generated by a related art RF switch coupled to an antenna having a worst-case 3:1 VSWR mismatch.

Figure 11C:
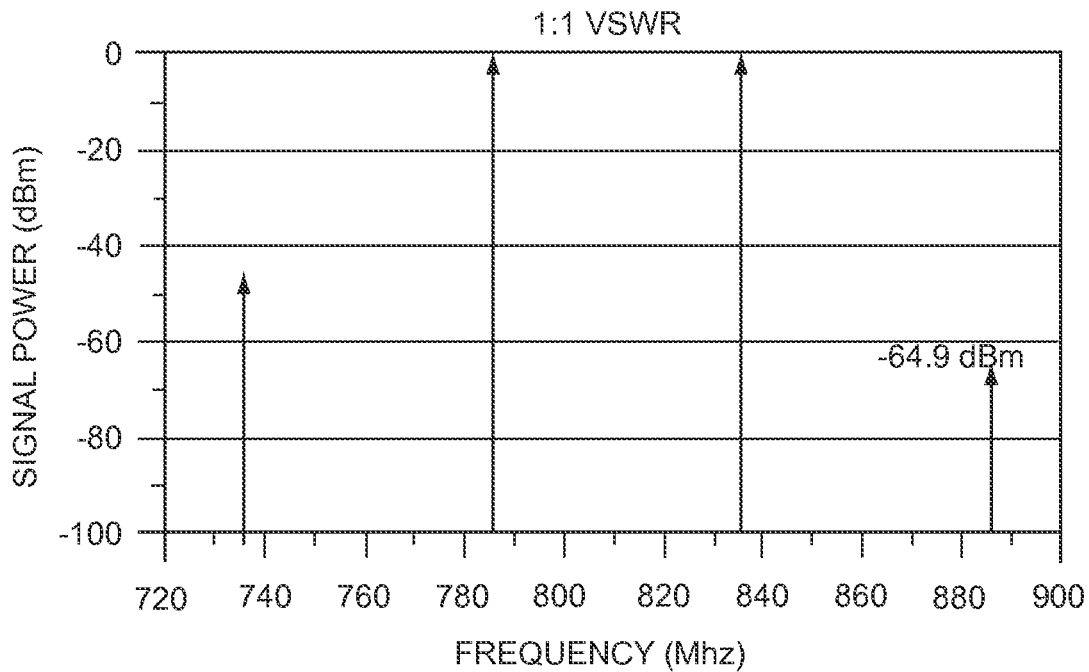

FIG. 11C is a spectral plot of IM3 products generated by an RF switch of the present disclosure that is coupled to an antenna having an ideal 1:1 VSWR.

Figure 11D:
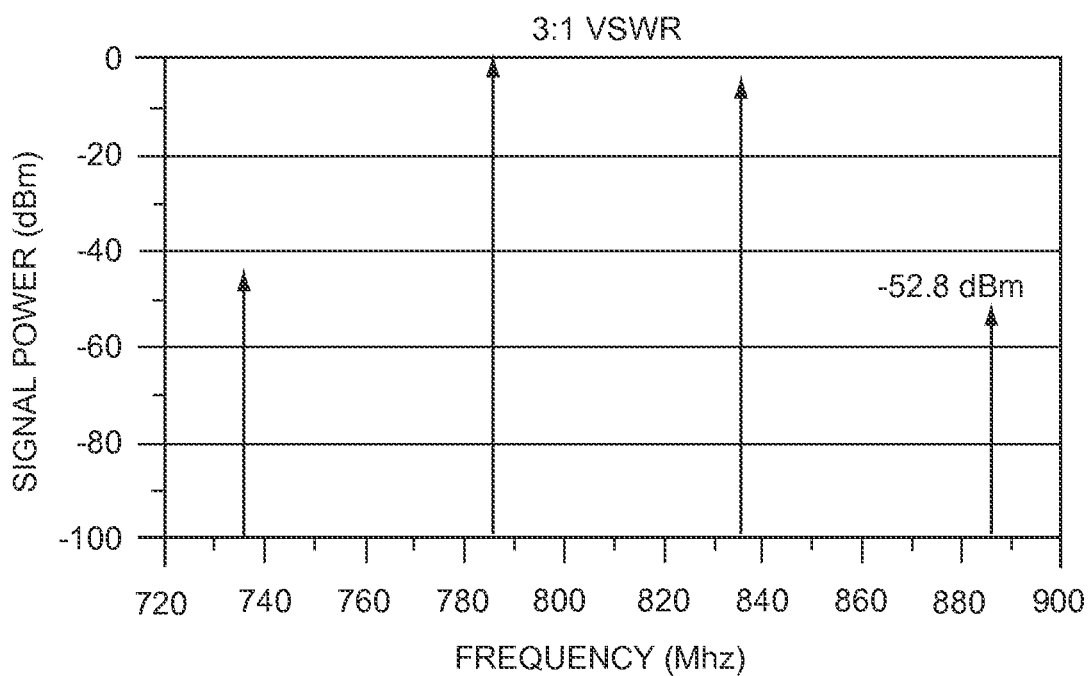

FIG. 11D is a spectral plot of IM3 products generated by an RF switch of the present disclosure that is coupled to an antenna having a worst-case VSWR mismatch.

Figure 12:
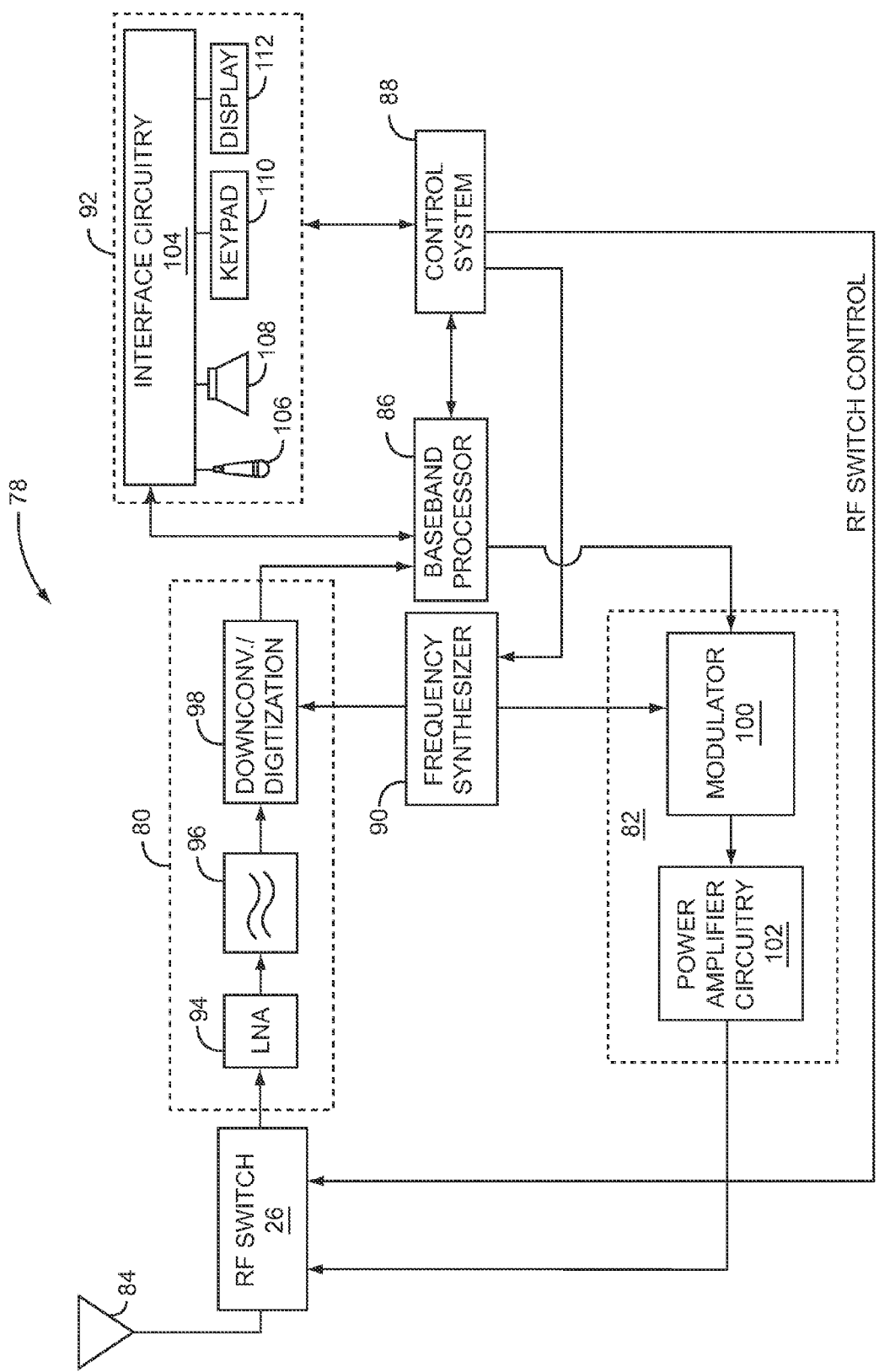

FIG. 12 is a block diagram of a mobile terminal that incorporates an embodiment of an RF switch of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In general, RF switch embodiments of present disclosure comprise nonlinear components such as groups of series stacked field effect transistors (FETs) that are divided into groups with phase shift networks coupled in series between the groups. FIG. 4 is a diagram illustrating an embodiment of an RF switch 26 that in accordance with the present disclosure provides IM3 suppression generated by signals propagating through the RF switch 26. In a particular case shown in FIG.

4, the RF switch 26 is divided such that a first half switch 28 and a second half switch 30 make room for a phase shift network 32 that is coupled in series between the first half switch 28 and the second half switch 30. The phase shift network in one embodiment comprises an inductor-capacitor (LC) tee network having series capacitors and a shunt inductor.

The first half switch 28 is coupled to a receive/transmit (RX/TX) terminal 34 that is communicatively coupled to a transceiver (not shown). In this case, a TX signal $\omega_{A\_desired}$ propagates into the first half switch 28, which generates IM3 products that propagate out of the first half switch 28 both towards the phase shift network 32 and back towards the RX/TX terminal 34. The second half switch 30 is coupled via an antenna terminal 36 to an antenna 38 that captures a leakage signal $\omega_{B\_leakage}$ that propagates into the second half switch 30, which generates IM3 products that propagate out of the second half switch 30 both towards the phase shift network 32 and back towards the antenna 38. As described in detail later, the IM3 products that pass through the phase shift network 32 combine and cancel with certain other IM3 products.

Figure 5:
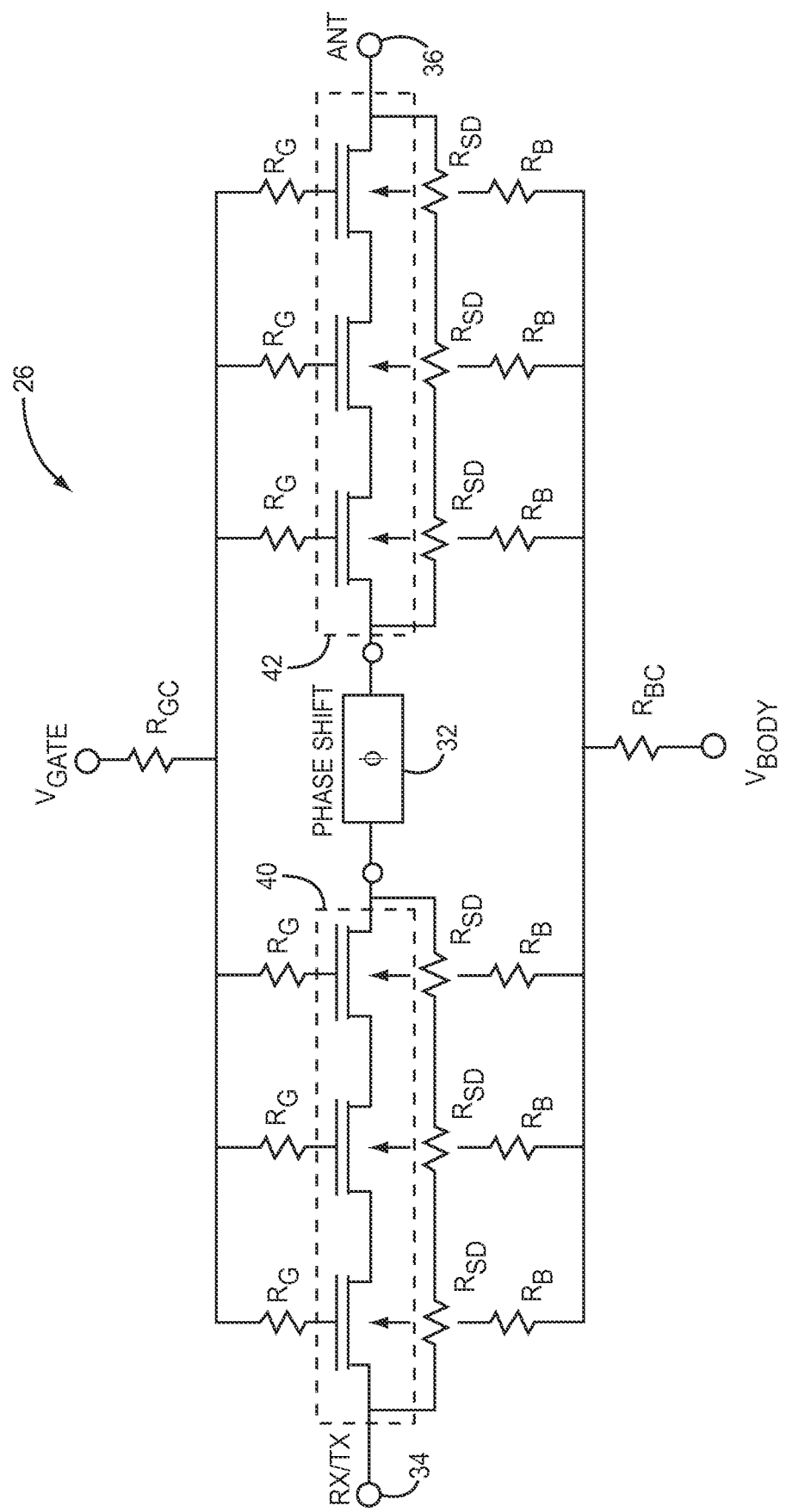
FIG. 5 is a circuit diagram of an embodiment according to the present disclosure that provides an RF switch comprising a phase shift network for suppressing IM3 products.

FIG. 5 is a circuit diagram of the RF switch 26 according to the present disclosure. The RF switch 26 comprises a first FET group 40 and a second FET group 42 with the phase shift network 32 coupled in series between the first FET group 40 and the second FET group 42. In this particular case, the first FET group 40 comprises the first half switch 28 (FIG. 4) and the second FET group 42 comprises the second half switch 30 (FIG. 4). The RF switch 26 includes a control terminal ($V_{GATE}$) for turning the first FET group 40 and the second FET group 42 on and off.

Since the RF switch 26 shares the same structure as the related art RF switch 10 (FIG. 2) with the exception of the phase shift network 32, a desired signal propagating through the RF switch 26 is unaffected except for a phase shift. Fortunately, a phase shift of the desired signal only introduces a negligible delay that is inconsequential with regard signal communication. It should be understood that the RF switch 26 is depicted as having only three FETs per either the first FET group 40 or the second FET group 42 for illustrative purposes only. A typical quantity of FETs for the RF switch 26 will be ten or greater in order to prevent voltage breakdown of the RF switch 26 under high voltage levels experienced during signal transmission. Also note that the phase shift angle $\Phi$ can include but is not limited to angles of 45° and 90°.

FIGS. 6A-D are switch diagrams that illustrate the generation, flow, and cancellation of IM3 products via an embodiment of the RF switch 26 wherein the phase shift network 32 provides a phase shift of 90°. Beginning with FIG. 6A assume that a transmit signal $A \cdot \sin(\omega_A t)$ propagates through the RX/TX terminal 34 towards the first half switch 28, while an interferer signal $B \cdot \sin(\omega_B t)$ captured by the antenna 38 propagates towards the second half switch 30. The transmit signal $A \cdot \sin(\omega_A t)$ and the interferer signal $B \cdot \sin(\omega_B t)$ are phase shifted by 90° as they pass through the phase shift network 32.

FIG. 6B depicts the generation of IM3 products as the transmit signal $A \cdot \sin(\omega_A t)$ and the interferer signal $B \cdot \sin(\omega_B t)$ intermodulate within the first half switch 28. The IM3 products generated can be calculated using expression (10) described in the background section. The IM3 products generated are $\alpha \cdot \sin([2\omega_A - \omega_B]t - 90°)$ and $\beta \cdot \sin([2\omega_B - \omega_A]t + 180°)$, where $\alpha$ and $\beta$ are their amplitudes. The IM3 product having the term $2\omega_A - \omega_B$ reaches the RX/TX terminal 34 and the antenna 38 with phases of −90° and 0°, respectively. The other IM3 product having the term $2\omega_B - \omega_A$ reaches the RX/TX terminal 34 and the antenna 38 with phases of 180° and 270°, respectively.

FIG. 6C depicts the generation of IM3 products as the transmit signal $A \cdot \sin(\omega_A t)$ and the interferer signal $B \cdot \sin(\omega_B t)$ intermodulate within the second half switch 30. The IM3 products generated are $\alpha \cdot \sin([2\omega_A - \omega_B]t + 180°)$ and $\beta \cdot \sin([2\omega_B - \omega_A]t - 90°)$, where $\alpha$ and $\beta$ are their amplitudes. The IM3 product having the term $2\omega_A - \omega_B$ reaches the RX/TX terminal 34 and the antenna 38 with phases of 270° and 180°, respectively. The other IM3 product having the term $2\omega_B - \omega_A$ reaches the RX/TX terminal 34 and the antenna 38 with phases of 0° and −90°, respectively.

FIG. 6D depicts a cancellation of the IM3 product having the term $2\omega_A - \omega_B$ and a cancellation of the IM3 product having the term $2\omega_B - \omega_A$. Remaining IM3 products are not canceled in this case.

FIGS. 7A-D are switch diagrams that illustrate the generation, flow, and cancellation of IM3 products via an embodiment of the RF switch 26 wherein the phase shift network 32 provides a phase shift of 45°. Beginning with FIG. 7A assume that a transmit signal $A \cdot \sin(\omega_A t)$ propagates through the RX/TX terminal 34 towards the first half switch 28 while an interferer signal $B \cdot \sin(\omega_B t)$ captured by the antenna 38 propagates towards the second half switch 30. The transmit signal $A \cdot \sin(\omega_A t)$ and the interferer signal $B \cdot \sin(\omega_B t)$ are phase shifted by 45° as they pass through the phase shift network 32.

FIG. 7B depicts the generation of IM3 products as the transmit signal $A \cdot \sin(\omega_A t)$ and the interferer signal $B \cdot \sin(\omega_B t)$ intermodulate within the first half switch 28. The IM3 products generated can be calculated using expression (10) described in the background section. The IM3 products generated are $\alpha \cdot \sin([2\omega_A - \omega_B]t - 45°)$ and $\beta \cdot \sin([2\omega_B - \omega_A]t + 90°)$, where $\alpha$ and $\beta$ are their amplitudes. The IM3 product having the term $2\omega_A - \omega_B$ reaches the RX/TX terminal 34 and the antenna 38 with phases of −45° and 0°, respectively. The other IM3 product having the term $2\omega_B - \omega_A$ reaches the RX/TX terminal 34 and the antenna 38 with phases of 90° and 135°, respectively.

FIG. 7C depicts the generation of IM3 products as the transmit signal $A \cdot \sin(\omega_A t)$ and the interferer signal $B \cdot \sin(\omega_B t)$ intermodulate within the second half switch 30. The IM3 products generated are $\alpha \cdot \sin([2\omega_A - \omega_B]t + 90°)$ and $\beta \cdot \sin([2\omega_B - \omega_A]t - 45°)$, where $\alpha$ and $\beta$ are their amplitudes. The IM3 product having the term $2\omega_A - \omega_B$ reaches the RX/TX terminal 34 and the antenna 38 with phases of 135° and 90°, respectively. The other IM3 product having the term $2\omega_B - \omega_A$ reaches the RX/TX terminal 34 and the antenna 38 with phases of 0° and −45°.

FIG. 7D depicts a cancellation of the IM3 product having the term $2\omega_A - \omega_B$ and a cancellation of the IM3 product having the term $2\omega_B - \omega_A$. Remaining IM3 products are not canceled in this case.

FIGS. 8A-E are switch diagrams that illustrate the generation, flow, and cancellation of IM3 products via an embodiment of another RF switch 44 wherein a first phase shift network 46 and a second phase shift network 48 each provide a phase shift of 60°. The first phase shift network 46 is coupled in series between a first one-third switch 50 and a second one-third switch 52. The second phase shift network 48 is coupled in series between the second one-third switch 52 and a third one-third switch 54.

Figure 8A:
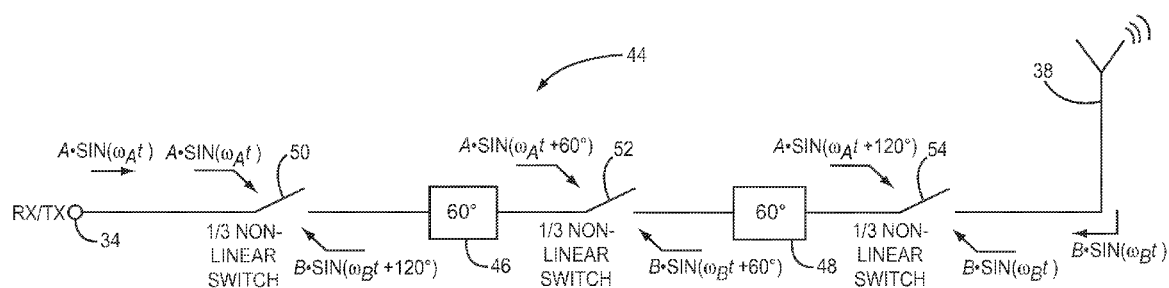

As shown in FIG. 8A assume that a transmit signal $A \cdot \sin(\omega_A t)$ propagates through the RX/TX terminal 34 towards the first one-third switch 50, while an interferer signal $B \cdot \sin(\omega_B t)$ captured by the antenna 38 propagates towards the third one-third switch 54. The transmit signal $A \cdot \sin(\omega_A t)$ is phase shifted by 60° as it passes through the first phase shift network 46 and it is phase shifted by another 60° as it passes through the second phase shift network 48 for a total of 120° as it approaches the antenna 38. Also, the interferer signal B·sin($\omega_B$t) is phase shifted by 60° as is passes through the second phase shift network 48 and it is phase shifted by another 60° as it passes through the first phase shift network 46 for a total of 120° as it approaches the RX/TX terminal 34.

Figure 8B:
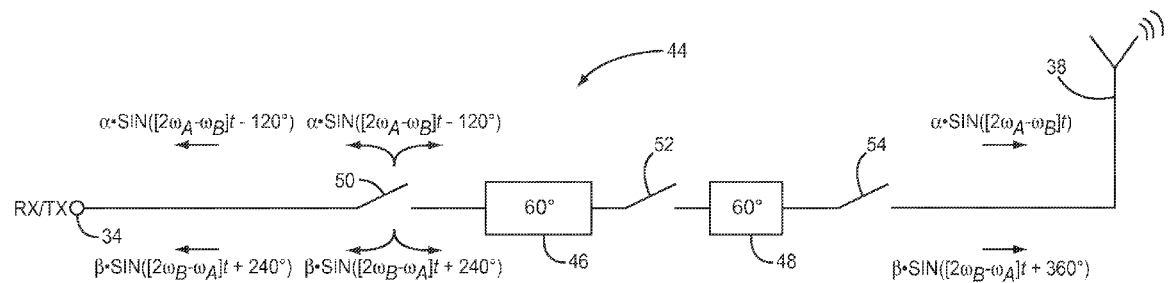

FIG. 8B depicts the generation of IM3 products as the transmit signal A·sin($\omega_A$t) and the interferer signal B·sin($\omega_B$t) intermodulate within the first one-third switch 50. The IM3 products generated can be calculated using expression (10) described in the background section. The IM3 products generated are $\alpha$·sin([$2\omega_A-\omega_B$]t−120°) and $\beta$·sin([$2\omega_B-\omega_A$]t+240°), where $\alpha$ and $\beta$ are their amplitudes. The IM3 product having the term $2\omega_A-\omega_B$ reaches the RX/TX terminal 34 and the antenna 38 with phases of −120° and 0°, respectively. The other IM3 product having the term $2\omega_B-\omega_A$ reaches the RX/TX terminal 34 and the antenna 38 with phases of 240° and 360°.

Figure 8C:
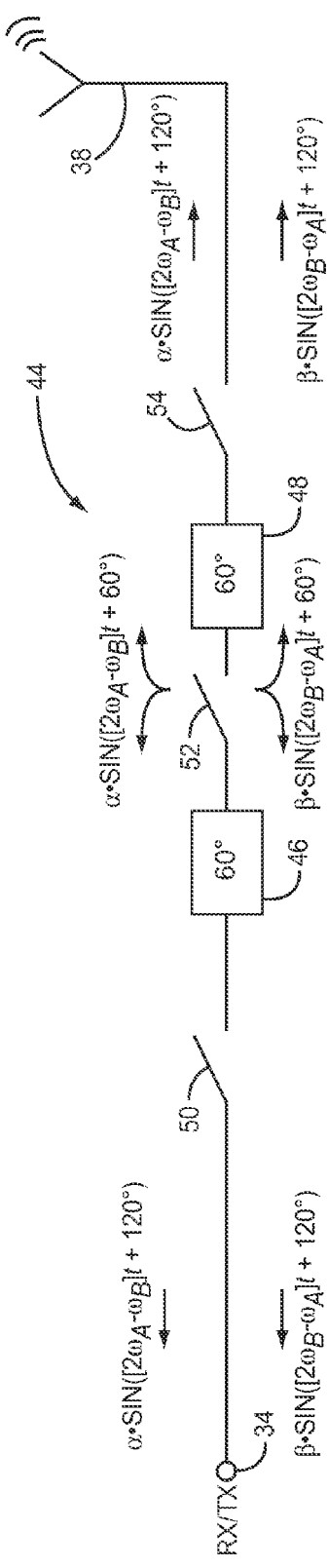

FIG. 8C depicts the generation of IM3 products as the transmit signal A·sin($\omega_A$t) and the interferer signal B·sin($\omega_B$t) intermodulate within the second one-third switch 52. The IM3 products generated are $\alpha$·sin([$2\omega_A-\omega_B$]t+60°) and $\beta$·sin([$2\omega_B-\omega_A$]t+60°), where $\alpha$ and $\beta$ are their amplitudes. The IM3 product having the term $2\omega_A-\omega_B$ reaches the RX/TX terminal 34 and the antenna 38 with a phase of 120°. The other IM3 product having the term $2\omega_B-\omega_A$ reaches the RX/TX terminal 34 and the antenna 38 with a phase of 120°.

Figure 8D:
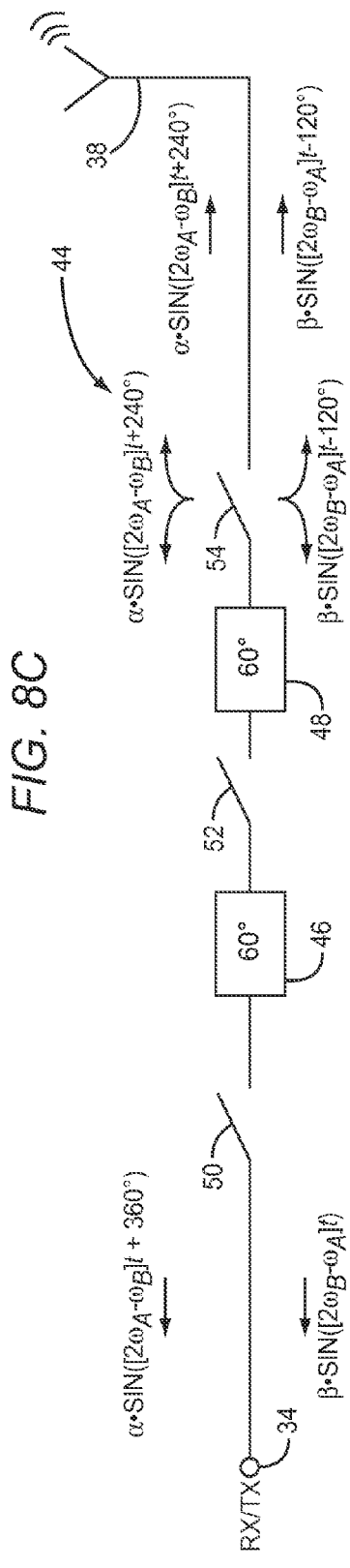

FIG. 8D depicts the generation of IM3 products as the transmit signal A·sin($\omega_A$t) and the interferer signal B·sin($\omega_B$t) intermodulate within the third one-third switch 54. The IM3 products generated are $\alpha$·sin([$2\omega_A-\omega_B$]t+240°) and $\beta$·sin([$2\omega_B-\omega_A$]t−120°), where $\alpha$ and $\beta$ are their amplitudes. The IM3 product having the term $2\omega_A-\omega_B$ reaches the RX/TX terminal 34 and the antenna 38 with phases of 360° and 240°, respectively. The other IM3 product having the term $2\omega_B-\omega_A$ reaches the RX/TX terminal 34 and the antenna 38 with phases of 0° and −120°.

Figure 8E:
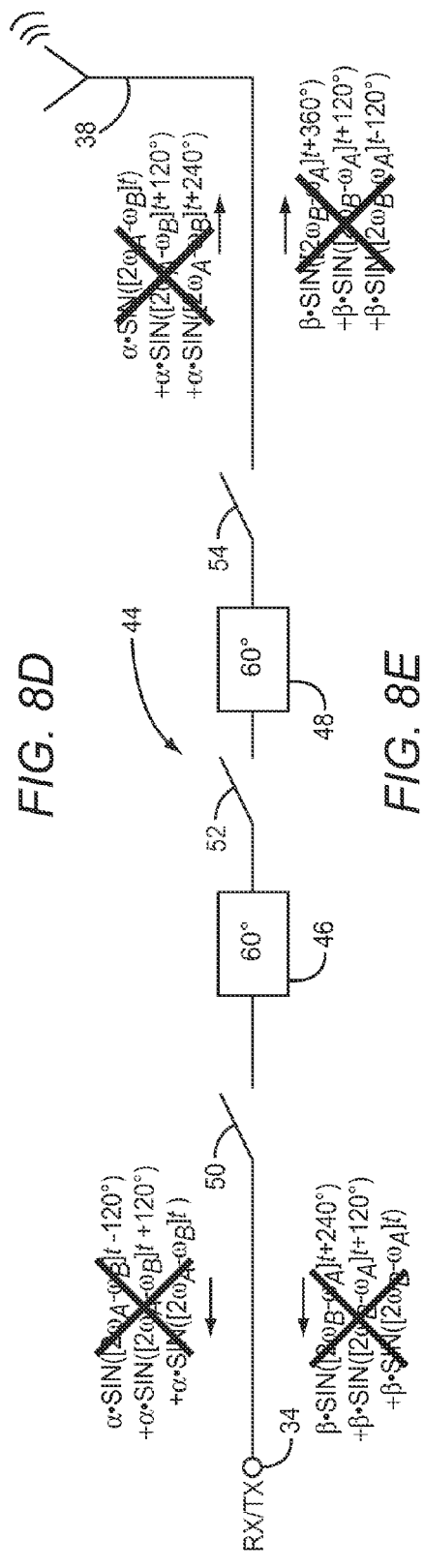

FIG. 8E depicts a cancellation of the IM3 product having the term $2\omega_A-\omega_B$ and a cancellation of the IM3 product having the term $2\omega_B-\omega_A$. Once the IM3 products having the terms $2\omega_A-\omega_B$ and $2\omega_B-\omega_A$ propagate completely through the RF switch 44, each of the IM3 products having the terms $2\omega_A-\omega_B$ and $2\omega_B-\omega_A$ are mutually 120° out of phase. Therefore, all of the IM3 products having the terms $2\omega_A-\omega_B$ and $2\omega_B-\omega_A$ are substantially canceled at both the RX/TX terminal 34 and the antenna 38.

FIGS. 9A-C are switch diagrams that illustrate the generation, flow, and cancellation of IM3 products resulting from two source signals propagating through the RX/TX terminal 34 towards the first half switch 28. For example, a simultaneous transmission of a plurality of signals from the antenna 38 occurs in an LTE-Advanced mode of operation. The two signals represented by A·sin($\omega_A$t) and B·sin($\omega_B$t) both have relatively high power and must pass through the RF switch 26 as they propagate from the RX/TX terminal to the antenna 38.

Beginning with the FIG. 9A, the signals A·sin($\omega_A$t) and B·sin($\omega_B$t) pass through the phase shift network 32 and are phase shifted by 90°. FIG. 9B depicts the generation of IM3 products as the signal A·sin($\omega_A$t) and the signal B·sin($\omega_B$t) intermodulate within the first half switch 28. The IM3 products generated can be calculated using expression (10) described in the background section. The IM3 products generated are $\alpha$·sin([$2\omega_A-\omega_B$]t) and $\beta$·sin([$2\omega_B-\omega_A$]t), where $\alpha$ and $\beta$ are their amplitudes. The IM3 product having the term $2\omega_A-\omega_B$ reaches the RX/TX terminal 34 and the antenna 38 with phases of 0° and 90°, respectively. The other IM3 product having the term $2\omega_B-\omega_A$ reaches the RX/TX terminal 34 and the antenna 38 with phases of 0° and 90°.

FIG. 9B also depicts the generation of IM3 products as the signal A·sin($\omega_A$t) and the signal B·sin($\omega_B$t) intermodulate within the second half switch 30. The IM3 products generated are $\alpha$·sin([$2\omega_A-\omega_B$]t+90°) and $\beta$·sin([$2\omega_B-\omega_A$]t)+90°, where $\alpha$ and $\beta$ are amplitudes. The IM3 product having the term $2\omega_A-\omega_B$ reaches the RX/TX terminal 34 and the antenna 38 with phases of 180° and 90°, respectively. The other IM3 product having the term $2\omega_B-\omega_A$ also reaches the RX/TX terminal 34 and the antenna 38 with phases of 180° and 90°, respectively.

FIG. 9C depicts a cancellation of both IM3 products propagating towards the RX/TX terminal 34. However, the IM3 products traveling towards the antenna 38 add in phase and therefore do not cancel. Hence, with regard to a simultaneous transmission of a plurality of signals from the antenna 38, the IM3 products that reach the antenna are not reduced. Therefore, the RF switch 26 of the present disclosure does nothing to improve a mobile terminal's ability to coexist with other nearby mobile terminals without polluting a local frequency spectrum. Nevertheless, the RF switch 26 does address the much larger issue of IM3 products leaking back towards the RX/TX terminal 34, where the IM3 products could de-sense receivers (not shown).

It should be noted that the phase shift network 32 comprised of an LC tee network can achieve an intended phase shift at only one distinct frequency point. However, for applications where the two interfering signals are relatively close in frequency, such as the case of SV-LTE, LC component values for the phase shift network can be chosen such that the phase shift over the entire range of IM3 products remains relatively close to an intended phase shift so as to substantially cancel the IM3 products as intended.

Another consideration for the RF switch 26 is its behavior when the antenna 38 deviates from a desired impedance. Antenna impedance issues are common for mobile terminals as it is virtually impossible to design an antenna that has an impedance that is impervious to changes in a nearby environment. For example, antenna impedance as seen by circuitry within a mobile terminal can vary dramatically as it is held in mid-air, versus held close to a user's ear, versus being placed upon a metal table, versus being placed inside a purse, etc. As antenna impedance deviates from its ideal value, an antenna reflection coefficient or voltage standing wave ratio (VSWR) increases. Higher VSWR values indicate that more energy is getting reflected by the antenna rather than being efficiently transmitted or received. Degraded or dropped calls, reduced data rates, and decreased battery efficiency are often the results of high VSWR values. In a context of IM3 products, higher VSWR values are also problematic because in addition to the initial IM3 product generation as the TX signal passes through the switches, subsequent IM3 products are generated when a portion of a TX signal reflects from the antenna 38 and travels back into the RF switch 26 from an opposite direction. The RF switch 26 cancels the initial IM3 generation, but once the TX signal is reflected by the antenna, any subsequent IM3 generation occurs without obstruction. Thus, the RF switch 26 is an improvement over the related art, but as antenna VSWR increases, more and more TX signal is reflected back toward the RX/TX terminal 34, and the advantage of IM3 cancellation via the RF switch 26 becomes less and less. However, as a simulation of an operation of the RF switch 26 in the next section demonstrates, even at a VSWR value of 3:1, the RF switch 26 provides around 11 dB of IM3 products suppression over the related art. Even at a 6:1 VSWR, the RF switch 26 provides 9 dB of extra IM3 products suppression over the related art.

FIG. 10 is a schematic diagram for a simulator configuration 56 that is usable to simulate the RF switch 26 depicted in FIG. 4. The simulator configuration 56 includes a TX signal generator 58, the first half switch 28, the phase shift network 32, and the second half switch 30. The simulator configuration 56 also includes an antenna VSWR tuning block 60 having a VSWR phase shift function 62, and a first ideal transformer 64. The antenna VSWR tuning block 60 is coupled between the second half switch 30 and a second ideal transformer 66 that in turn is coupled through a current probe 68 to a first resistor 70 that simulates the antenna 38 (FIG. 4). An interferer signal generator 72 is communicatively coupled through a second resistor 74 to a tap 76 between the current probe 68 and the second ideal transformer 66.

Figure 1:
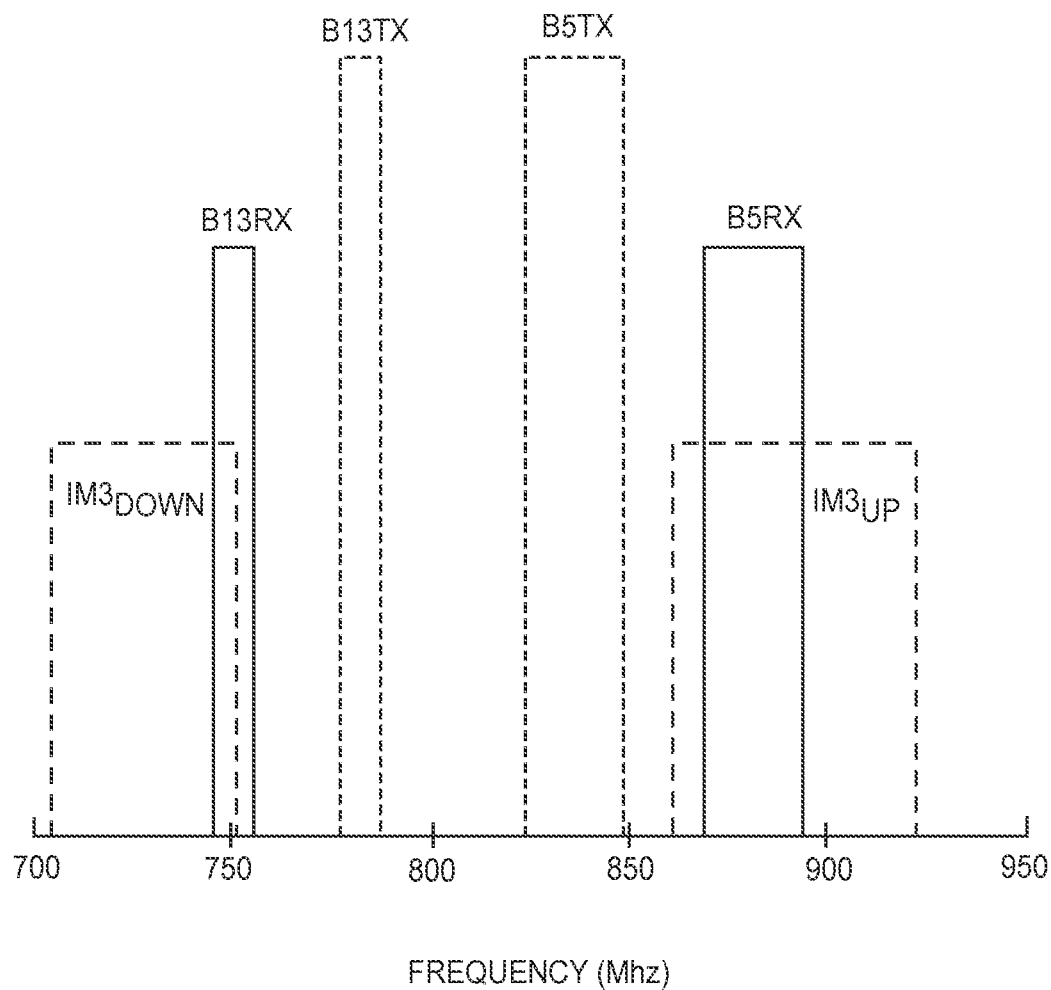
FIG. 1 is a frequency spectrum diagram for universal mobile telecommunications system (UMTS) band 5 and evolved UMTS terrestrial radio access (E-UTRA) Band 13 that illustrates the impact of undesirable third order intermodulation (IM3) products on receive (RX) bands.
Figure 2:
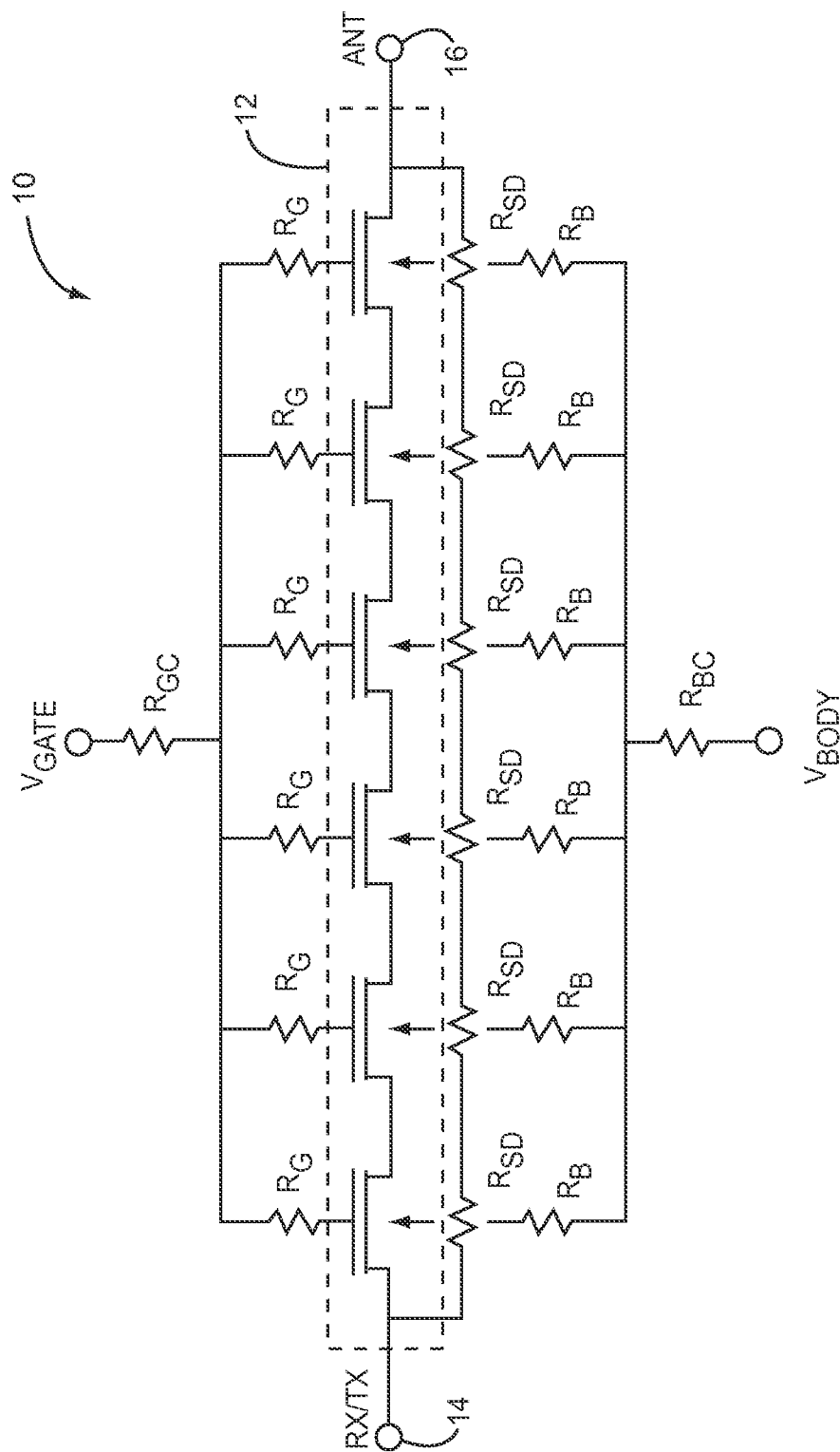
FIG. 2 is a circuit diagram for a related art RF switch having six stacked field effect transistors (FETs) for enhanced voltage handling capability

The simulation sets a phase shift value of −45°. The phase shift value of −45° provides the same cancellation as a +45° shift, but allows the phase shift network 32 to be implemented with a series-C/shunt-L/series-C tee network having realistic quality (Q) values for the purpose of simulation. The phase shift network 32 can be implemented using a surface mount device (SMD) inductor since capacitors with relatively high Qs can be integrated on-chip with the RF switch 26. A second simulation removes the phase shift network 32 to provide a comparison to the related art RF switch 10 (FIG. 2).

The simulation begins on the left side of FIG. 10 with a TX signal at 786 MHz at a power of 0 dBm. The signal passes through the first halfswitch 28, which is modeled as one of two identical cascaded scattering (S)-parameter blocks necessary to achieve the frequency response of a Silicon-on-insulator (SOI) antenna switch, plus some additional third-order nonlinear components on either side. After passing through the first half switch 28, the signal then propagates through the phase shift network 32 to provide −45° and into the second half switch 30, and then to the first resistor 70 that simulates the antenna 38 (FIG. 4). Meanwhile, adjacent to the first resistor 70, a high-power interferer signal at 836 MHz is coupled into the RF switch 26 through the second resistor 74, resulting in a power level of approximately 0 dBm at the first resistor 70 that simulates the antenna 38. The first ideal transformer 64 and the second ideal transformer 66 along with the phase shift network 32 allow for a simulation-selectable non-ideal antenna VSWR.

Results from the first and second simulations are shown in FIGS. 11A through 11D. The results are presented graphically as spectral plots clearly show the input TX signal at 786 MHz and the interferer signal at 836 MHz, both at around 0 dBm, as well as the resultant $IM3_{down}$ and $IM3_{up}$ products at 736 MHz and 886 MHz respectively. In the first two plots of FIG. 11A and FIG. 11B, the results are shown for the circuit of the prior art (i.e. with the phase shift network 32 removed from the simulation configurator 56), with an ideal 1:1 antenna VSWR and a worst-case 3:1 VSWR, respectively. The worst-case 3:1 VSWR is determined by first mismatching the antenna impedance by a 3:1 ratio, then varying the VSWR phase through a full 360° (via the VSWR phase shift function 62 in the simulation configurator 56 of FIG. 10) until a worst-case is found. The simulation shows that the prior art circuit results in $IM3_{up}$ generation at levels of −42.8 dBm with an ideal antenna. With a 3:1 mismatch the $IM3_{up}$ level increases slightly to −41.8 dBm. This can be compared to FIG. 11C and FIG. 11D which show the same results for the RF switch 26 that includes the phase shift network 32 that is in accordance with the present disclosure. In this case the $IM3_{up}$ power is reduced to −64.9 dBm under ideal conditions and −52.8 dBm with the worst-case 3:1 mismatched. The reason that the $IM3_{up}$ power is not cancelled entirely even under ideal conditions is due to the aforementioned non-ideal frequency-dependent phase shift of an LC tee network. Nevertheless, the RF switch 26 improves $IM3_{up}$ suppression by approximately 22 dB under matched conditions and 11 dB under 3:1 mismatched conditions. Under a 6:1 VSWR mismatch (not shown), the improvement is 9 dB. This improvement should be enough to address SV-LTE using existing switch technology.

Turning now to FIG. 12, the RF switch 26 is incorporated in a mobile terminal 78, such as a cellular handset, a personal digital assistant (PDA), or the like. The basic architecture of the mobile terminal 78 may include a receiver front end 80, an RF transmitter section 82, an antenna 84, a baseband processor 86, a control system 88, a frequency synthesizer 90, and an interface 92. The receiver front end 80 receives information bearing RF signals from one or more remote transmitters provided by a base station. A low noise amplifier 94 amplifies the signal. A filter circuit 96 minimizes broadband interference in the received signal, while downconversion and digitization circuitry 98 downconverts the filtered, received signal to an intermediate or baseband frequency signal, which is then digitized into one or more digital streams. The receiver front end 80 typically uses one or more mixing frequencies generated by the frequency synthesizer 90.

The baseband processor 86 processes the digitized received signal to extract the information or data bits conveyed in the received signal. This processing typically comprises demodulation, decoding, and error correction operations. As such, the baseband processor 86 is generally implemented in one or more digital signal processors (DSPs).

On the transmit side, the baseband processor 86 receives digitized data, which may represent voice, data, or control information from the control system 88 which it encodes for transmission. The encoded data is output to the RF transmitter 82, where it is used by a modulator 100 to modulate a carrier signal that is at a desired transmit frequency. Power amplifier (PA) circuitry 102 amplifies the modulated carrier signal to a level appropriate for transmission from the antenna 84.

A user may interact with the mobile terminal 78 via the interface 92, which may include interface circuitry 104 associated with a microphone 106, a speaker 108, a keypad 110, and a display 112. The interface circuitry 104 typically includes analog-to-digital converters, digital-to-analog converters, amplifiers, and the like. Additionally, it may include a voice encoder/decoder, in which case it may communicate directly with the baseband processor 86.

The microphone 106 will typically convert audio input, such as the user's voice, into an electrical signal, which is then digitized and passed directly or indirectly to the baseband processor 86. Audio information encoded in the received signal is recovered by the baseband processor 86 and converted into an analog signal suitable for driving the speaker 108 by the interface circuitry 104. The keypad 110 and the display 112 enable the user to interact with the mobile terminal 78 inputting numbers to be dialed, address book information, or the like, as well as monitoring call progress information.

In general, an RF switch having stacked FETs can be broken into an N number of FET groups separated by phase shift networks that each provides around 180°/N of phase shift to achieve a reduction of IM3 products, where N is a natural number greater than 1. As N gets larger, circuit complexity for the RF switch goes up, but higher-order intermodulation products such as IM5, IM7, etc. at frequencies of $3\omega_A-2\omega_B$, $2\omega_A-3\omega_B$, $4\omega_A-3\omega_B$, $3\omega_A-4\omega_B$, etc. may be canceled as well.

It should also be appreciated that RF switch concepts disclosed herein are also applicable to other RF switch technologies besides SOI, such as Complementary Metal-Oxide Semiconductor (CMOS), Silicon-on-Sapphire (SOS), or Pseudomorphic High Electron Mobility Transistor (pHEMT), as well as other RF components besides switches, as long as the components have low loss and small reflection coefficients over an entire frequency span from the lowest IM product to be canceled to the highest IM product to be canceled.

Furthermore, one skilled in the art can also see that if the nonlinear components, themselves, impart some extra degree of phase rotation to the signal, the phase shift network 32 of the present disclosure can be adjusted accordingly to compensate or take advantage of it.

Some degree of asymmetry may need to be introduced among the N number of FET groups to achieve optimum RF performance. For example, parasitic compensation requires adding slightly different amount of parasitic capacitance to each FET depending upon its ordinal position in the series stack in order to maintain equal voltage drop across each FET. To complicate matters further, the greatest source of nonlinearity in the RF switch is sometimes not the FETs at all, but rather metal bond pads, bus bars, and other transmission lines on a chip on which the RF switch is fabricated. This is especially true in Silicon-on-insulator (SOI) technology in which high voltages form a depletion layer and an inversion layer in a bulk substrate below an insulating layer. Therefore, care should be taken to maintain symmetry among the FET groups of the RF switch including the bond pads and transmission lines.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF) switch adapted to suppress third order intermodulation (IM3) products generated as RF signals propagate through the RF switch comprising:
   N and only N semiconductor switch segments; and
   N−1 and only (N−1) phase shift networks, individual ones of the N−1 phase shift networks being coupled between and in series with adjacent ones of the N and only N semiconductor switch segments where N is a natural number that is at least 3, and wherein each of the N−1 and only (N−1) phase shift networks provides around 180°/N of phase shift.

2. The RF switch of claim 1 wherein the N and only N semiconductor switch segments comprises groups of series stacked field effect transistors (FETs).

3. The RF switch of claim 1 wherein N=3 and the N−1 and only (N−1) phase shift networks provide around 60° of phase shift.

4. The RF switch of claim 1 wherein the N−1 and only (N−1) phase shift networks each comprise an inductor-capacitor (LC) tee network.

5. The RF switch of claim 4 wherein the LC tee network comprises series capacitors and a shunt inductor.

6. The RF switch of claim 5 wherein the series capacitors are integrated with the RF switch and the shunt inductor is a surface mount device (SMD).

7. A method to suppress IM3 products generated as RF signals propagate through an RF switch, the method comprising:
   providing the RF switch with N and only N semiconductor switch segments;
   providing N−1 and only (N−1) phase shift networks; and
   coupling individual ones of the N−1 and only (N−1) phase shift networks between and in series with adjacent ones of the N and only N semiconductor switch segments where N is a natural number that is at least 3, and wherein each of the N−1 and only (N−1) phase shift networks provides around 180°/N of phase shift.

8. The method of claim 7 wherein the IM3 products are reduced as the RF signals propagate through the RF switch in a same direction.

9. The method of claim 7 wherein the IM3 products are reduced as the RF signals propagate through the RF switch from opposite directions.

10. The method of claim 7 wherein the N and only N semiconductor switch segments comprises groups of series stacked field effect transistors (FETs).

11. The method of claim 7 wherein N=3 and one of the N−1 and only (N−1) phase shift networks provides around 60° of phase shift.

12. The method of claim 7 wherein the N−1 and only (N−1) phase shift networks each comprise an inductor-capacitor (LC) tee network.

13. The method of claim 12 wherein the LC tee network comprises series capacitors and a shunt inductor.

14. The method of claim 13 wherein the series capacitors are integrated with the RF switch and the shunt inductor is a surface mount device (SMD).

15. A mobile terminal comprising:
   an antenna;
   a receiver front end;
   an RF switch having an antenna terminal coupled to the antenna and a terminal coupled to the receiver front end, the RF switch comprising:
      N and only N semiconductor switch segments having a control terminal;
      N−1 and only (N−1) phase shift networks, individual ones of the N−1 phase shift networks being coupled between and in series with adjacent ones of the N and only N semiconductor switch segments where N is a natural number that is at least 3, wherein each of the N−1 and only (N−1) phase shift networks provides around 180°/N of phase shift; and
   a control system communicatively coupled to the control terminal for turning on and turning off the N and only N semiconductor switch segments.

16. The mobile terminal of claim 15 wherein the N and only N semiconductor switch segments comprises groups of series stacked field effect transistors (FETs).

17. The mobile terminal of claim 15 wherein N=3 and the N−1 and only (N−1) phase shift networks provides around 60° of phase shift.

18. The mobile terminal of claim 15 wherein the N−1 and only (N−1) phase shift networks each comprise an inductor-capacitor (LC) tee network.

19. The mobile terminal of claim 18 wherein the LC tee network comprises series capacitors and a shunt inductor.

20. The mobile terminal of claim 19 wherein the series capacitors are integrated with the RF switch and the shunt inductor is an SMD.

* * * * *